(12) United States Patent
Heitzer

(10) Patent No.: US 12,091,105 B2
(45) Date of Patent: Sep. 17, 2024

(54) METHOD FOR OPERATING A STEERING SYSTEM, AND STEERING SYSTEM

(71) Applicant: ZF Automotive Germany GmbH, Alfdorf (DE)

(72) Inventor: Heinz-Dieter Heitzer, Heinsberg (DE)

(73) Assignee: ZF Active Safety GMBH, Koblenz (DE)

( * ) Notice: Subject to any disclaimer, the term of this patent is extended or adjusted under 35 U.S.C. 154(b) by 535 days.

(21) Appl. No.: 16/650,735

(22) PCT Filed: Oct. 5, 2018

(86) PCT No.: PCT/EP2018/077180
§ 371 (c)(1),
(2) Date: Mar. 25, 2020

(87) PCT Pub. No.: WO2019/068891
PCT Pub. Date: Apr. 11, 2019

(65) Prior Publication Data
US 2020/0269902 A1   Aug. 27, 2020

(30) Foreign Application Priority Data
Oct. 6, 2017   (DE) .......................... 102017123272.9

(51) Int. Cl.
*B62D 5/04*   (2006.01)
*B62D 15/02*   (2006.01)

(52) U.S. Cl.
CPC .......... *B62D 5/046* (2013.01); *B62D 5/0421* (2013.01); *B62D 15/0205* (2013.01); *B62D 15/0215* (2013.01); *B62D 15/025* (2013.01)

(58) Field of Classification Search
CPC .. B62D 5/046; B62D 5/0421; B62D 15/0205; B62D 15/0215; B62D 15/025; B62D 1/046; B62D 1/286
(Continued)

(56) References Cited

U.S. PATENT DOCUMENTS

2004/0088093 A1* 5/2004 Yao ........................ B62D 6/008
                                                                    180/443
2014/0277896 A1* 9/2014 Lathrop ................. B62D 1/046
                                                                    74/484 R
(Continued)

FOREIGN PATENT DOCUMENTS

DE   102004057262 A1   6/2006
DE   102014011278 A1   1/2015
(Continued)

*Primary Examiner* — Scott A Reinbold
(74) *Attorney, Agent, or Firm* — Kristin L. Murphy

(57) ABSTRACT

A method for operating a steering system includes the steps of: (1) acquiring a variable at least during the partially automated driving; (2) determining whether or not the driver wishes to control the vehicle manually using a variable; (3) ending the partially automated driving and converting steering movements applied by the driver into steering movements of the motor vehicle via a front-axle actuator unit irrespective of the current rotational angle of the steering wheel, if the driver wishes to control the vehicle manually. The variable acquired during partially automated driving may be any of the following: a driver gripping force applied to the steering wheel, a driver torque applied to the steering wheel, deflection of the steering wheel, a gradient of the driver gripping force to the steering wheel, a gradient of the driver torque applied to the steering wheel, and deflection gradient of the steering wheel.

10 Claims, 1 Drawing Sheet

(58) Field of Classification Search
USPC .......................................................... 180/402
See application file for complete search history.

(56) References Cited

U.S. PATENT DOCUMENTS

| | | | | |
|---|---|---|---|---|
| 2016/0375923 | A1* | 12/2016 | Schulz | B62D 1/12 |
| | | | | 74/493 |
| 2017/0088167 | A1* | 3/2017 | Fujii | B62D 1/286 |
| 2017/0137060 | A1* | 5/2017 | Wanner | B62D 1/286 |
| 2019/0016370 | A1* | 1/2019 | Hwang | B62D 5/008 |

FOREIGN PATENT DOCUMENTS

| | | | | |
|---|---|---|---|---|
| DE | 102014107194 A1 | | 11/2015 | |
| DE | 102014216105 A1 | | 2/2016 | |
| DE | 102014216140 A1 | | 2/2016 | |
| DE | 102016002289 A1 | | 8/2016 | |
| DE | 102016211468 A1 | * | 12/2017 | ............. B62D 1/286 |
| WO | 2016169684 A1 | | 10/2016 | |
| WO | 2017102057 A1 | | 6/2017 | |

* cited by examiner

METHOD FOR OPERATING A STEERING SYSTEM, AND STEERING SYSTEM

CROSS-REFERENCE TO RELATED APPLICATION

This application is a national stage of International Application No. PCT/EP2018/077180, filed Oct. 5, 2018, the disclosure of which is incorporated herein by reference in its entirety, and which claimed priority to German Patent Application No. 102017123272.9, filed Oct. 6, 2017, the disclosure of which is incorporated herein by reference in its entirety.

TECHNICAL FIELD

The invention relates to a method for operating a steering system of a motor vehicle, in particular a steer-by-wire steering system. The invention also relates to a steering system for a motor vehicle.

Electromechanically assisted steering systems (wherever the term "steering system" is used in the following text an electromechanically assisted steering system is therefore always meant) provide a large number of advantages over conventional hydraulic power assisted steering systems. In addition to demand-based actuation of the electric auxiliary drives, these steering systems can also be used to perform automated or semi-automated control of a vehicle. In this context, various sensors or cameras are used to be able to determine a travel direction. In particular in the case of high speeds of the motor vehicle, such systems for the automated steering of the vehicle are to have ever higher reliability.

In the case of motor vehicles which drive in an automated fashion which are according to the automation levels 3 and 4 of the SAE standard J3016 (conditional automation or a high level of automation), the control system is to control the motor vehicle automatically at least temporarily as long as the driver does not wish to assume control over the motor vehicle himself.

Depending on automation level and/or legal requirements, the driver is to be able to resume full control over the vehicle at any time. For example, the automated driving system requests the driver to assume control, or the driver assumes control over the motor vehicle without being requested to do so by the automated driving system. In order to ensure that the driver is able to assume control over the motor vehicle at any time there can be provision that the driver has to have his hands on the steering wheel at all times.

While the motor vehicle drives in an automated fashion, a steering wheel with corresponding input means can serve as a man-machine interface for an Infotainment system of the motor vehicle. However, for the driver it is difficult to operate the input means, in particular in bends, if the steering wheel is turned in bends in a way corresponding to the position of front wheels of the motor vehicle. Therefore, in automated driving systems which are already known, there is provision in a specific driving mode that the steering wheel is moved into a predefined, static position during the automated driving.

If, after a section of the route travelled along in an automated fashion, the driver wishes to steer the vehicle manually again, for example because intervention of the driver is necessary, the driver is to be able to steer the motor vehicle again as soon as possible.

SUMMARY

The object of the invention is therefore to make available a steering system and a method for operating the steering system, which permits a rapid change-over from automated driving to manual driving.

The object is achieved according to the invention by means of a method of the type specified at the beginning, wherein the steering system comprises a steering wheel actuator unit which is assigned to a steering wheel, a front-axle actuator unit and a control unit, and wherein the control unit is designed to control the motor vehicle in at least partially automated fashion, having the following steps. At least one of the following variables is determined: a gripping force which a driver applies to the steering wheel, a torque which the driver applies to the steering wheel, a deflection of the steering wheel, in particular a rotational angle of the steering wheel, a gradient of the gripping force which the driver applies to the steering wheel, a gradient of the torque which the driver applies to the steering wheel, and a gradient of the deflection of the steering wheel, in particular a rotational angle speed of the steering wheel. Using the at least one variable it is determined whether or not the driver wishes to control the vehicle manually. The at least partially automated driving is ended and steering movements which the driver applies to the steering wheel are converted into steering movements of the motor vehicle by the front-axle actuator unit irrespective of the current rotational angle of the steering wheel, if it has been determined that the driver wishes to control the vehicle manually. Switching over between automated driving and manual control of the motor vehicle therefore takes place in a seamless and particularly rapid fashion. The driver does not have to press any push button keys or pull the steering wheel toward himself in order to switch over from automated driving to mechanical driving. The invention is based on the basic concept that after the switching over into the manual control of the motor vehicle steering movements of the driver at the steering wheel are converted immediately into steering movements of the motor vehicle.

In particular, in this context a discrepancy between the current rotational position of the steering wheel and a position of front wheels of the motor vehicle is initially ignored. The steering wheel therefore does not firstly have to be moved into a position which corresponds to the position of the front wheels but instead can be used immediately to control the motor vehicle.

One aspect of the invention provides that it is determined that the driver wishes to steer the vehicle manually if the at least one acquired variable exceeds a first predefined value or if a plurality of the acquired variables exceed predefined values. If the driver intervenes, for example, in an emergency situation and assumes manual control of the motor vehicle, it is to be expected that at least one of the acquired variables has a high value. In particular, the torque which the driver applies to the steering wheel and also the gradient of the torque in the case of rapid engagement of the driver assume high values, for which reason they are particularly suitable as an indicator that the driver wishes to control the vehicle manually.

During the automated driving, the steering wheel is preferably held in a predefined rotational position with a torque, in particular wherein the torque is limited to a second predefined value. There can be provision that it is determined that the driver wishes to steer the vehicle manually if the torque which the driver applies to the steering wheel exceeds the second predefined value. This prevents the steering wheel from being unintentionally rotated out of the predefined rotational position, for example by vibrations or by a torque which the driver unintentionally applies to the steering wheel. The predefined position can be selected in such a way that the driver can operate particularly easily input means which are present on the steering wheel, for example for an Infotainment system of the motor vehicle.

According to a further aspect, the predefined rotational position is determined as a function of operating parameters of the motor vehicle. The operating parameters can comprise a speed of the motor vehicle, a longitudinal acceleration of the motor vehicle and/or a lateral acceleration of the motor vehicle. In particular, the predefined rotational position is chronologically variable and is respectively newly determined at certain time intervals on the basis of the current operating parameters. The predefined rotational position can be determined in such a way that when input means of the steering wheel are operated the driver is less likely to suffer from motion sickness or said sickness is at least attenuated.

Signals of the control unit are preferably suppressed if it is ascertained that the driver wishes to control the motor vehicle manually. As a result, the automated controller of the motor vehicle no longer intervenes substantially in the steering of the motor vehicle but remains active in the background. If it is determined again at a later time that the driver no longer wishes to steer the motor vehicle manually, the automated controller can quickly take over the steering of the motor vehicle again.

According to one refinement of the invention there is provision that the control unit is switched off at least partially if it is determined that the driver wishes to control the motor vehicle manually. As a result the automated controller of the motor vehicle no longer intervenes substantially, or even no longer intervenes at all, in the steering of the motor vehicle. There can be provision that the control unit is switched off entirely if it is determined that the driver wishes to control the motor vehicle manually.

According to a further refinement, it is ascertained at certain time intervals, in particular continuously, whether or not the driver wishes to control the motor vehicle manually. As a result, switching over is performed particularly quickly between automated driving and manual driving if the driver's desire to steer the motor vehicle manually changes.

A further aspect provides that data and/or signals of other systems of the motor vehicle, in particular of an Infotainment system and/or of a visual driver monitoring system, are used to determine whether or not the driver wishes to control the vehicle manually. There can be provision that the driver can activate or deactivate the automated control of the motor vehicle by activating input means of one of the systems. The visual monitoring system is, for example, a camera which monitors the driver's eye movements.

It is preferably determined by means of fuzzy logic whether the driver wishes to control the motor vehicle manually, in particular when the at least one variable is processed by means of fuzzy logic. By means of fuzzy logic it is also possible to model complex systems in such a way that reliable predictions about the system behavior can be made on the basis of statistical investigations and/or expert assessments. Accordingly, by means of fuzzy logic it is possible to reliably determine, from a potentially complex data situation, whether or not the driver wishes to control the motor vehicle manually.

According to a further aspect, after it has been detected that the driver wishes to control the motor vehicle manually, a discrepancy between the current rotational position of the steering wheel and a position of the front wheels of the motor vehicle over a certain time period, in particular during cornering, is compensated by electronically changing the transmission ratio between the steering wheel and the wheels. This can occur in a way which is virtually unnoticeable, that is to say imperceptible, for the driver so that even during this certain time period the driver can control the motor vehicle in the accustomed fashion. Therefore, the driver is e.g. no longer irritated by the fact that the steering wheel is actually in a cornering position even though the vehicle is travelling straight ahead.

The object is also achieved according to the invention by a steering system for a motor vehicle for carrying out the method described above, in particular a steer-by-wire steering system, having a steering wheel actuator unit which is assigned to a steering wheel, a front-axle actuator unit which is assigned to a front axle of the motor vehicle, and a control unit, wherein the steering wheel actuator unit is designed to apply torque to the steering wheel, wherein the steering wheel actuator unit is designed to acquire at least one of the following variables: a gripping force which a driver applies to the steering wheel, a torque which the driver applies to the steering wheel, a deflection of the steering wheel, in particular a rotational angle of the steering wheel, a gradient of the gripping force which the driver applies to the steering wheel, a gradient of the torque which the driver applies to the steering wheel, and a gradient of the deflection of the steering wheel, in particular a rotational angle speed of the steering wheel. The front-axle actuator unit is designed to apply a torque to a lower part of the steering system in order to steer wheels of the motor vehicle, wherein the front-axle actuator unit is also designed to determine a torque which is applied to a lower part of the steering system and/or a rotational angle of the wheels of the motor vehicle, wherein the steering wheel actuator unit, the front-axle actuator unit and the control unit are each connected to one another in a signal-transmitting fashion, and wherein the control unit is designed to control the steering wheel actuator unit and the front-axle actuator unit independently of one another. With respect to the advantages, reference is made to the above explanations.

The steering wheel actuator unit preferably comprises a rotational angle sensor and/or a torque sensor. As a result, the steering wheel actuator unit can determine a rotational angle of the steering wheel and/or a torque which acts on the steering wheel.

One aspect provides that the front-axle actuator unit comprises a rotational angle sensor and/or a torque sensor. As a result, the front-axle actuator unit can determine a rotational angle of the lower part of the steering system and/or a torque which acts on the lower part of the steering system.

A further aspect provides that the control unit is designed to process signals and/or data of the steering wheel actuator unit by means of fuzzy logic.

According to one refinement of the invention, the steering wheel actuator unit has a control module which is designed to process signals and/or data of the steering wheel actuator unit by means of fuzzy logic.

According to a further refinement of the invention there is provision that the control unit and/or the control module are/is connected to further control modules of the motor vehicle via a bus in a data-transmitting fashion.

The fuzzy logic is preferably implemented on a system which comprises the control unit and/or the control module, the further control modules and the bus.

BRIEF DESCRIPTION OF THE DRAWINGS

Further advantages and properties of the invention can be found in the following description and the drawings to which reference is made. In the drawings.

DETAILED DESCRIPTION

Figure 1:
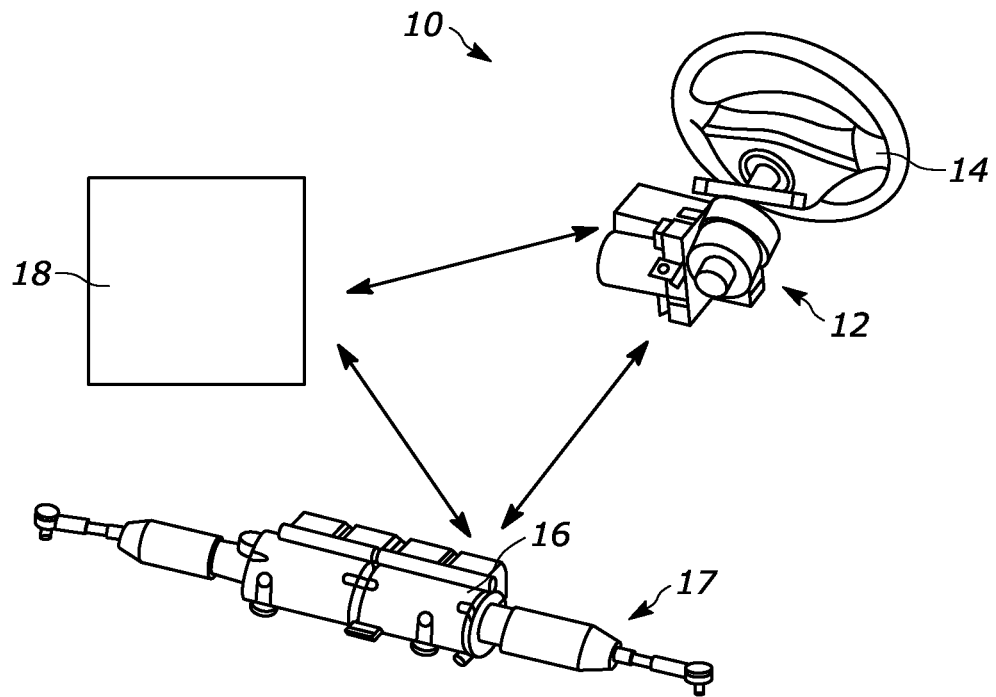
FIG. 1 shows a steering system according to the invention.

FIG. 1 shows a steering system 10 for a motor vehicle, which steering system 10 is embodied as a steer-by-wire steering system 10.

The steering system 10 comprises a steering wheel actuator unit 12 which is assigned to a steering wheel 14. The steering wheel actuator unit 12 is designed to apply a torque to the steering wheel 14. In particular, the steering wheel actuator unit 12 is designed to set a rotational position of the steering wheel 14.

The steering wheel actuator unit 12 additionally comprises a rotational angle sensor and/or a torque sensor. The steering wheel actuator unit 12 can as a result determine a rotational angle of the steering wheel 14 and/or a torque acting on the steering wheel 14.

The steering system 10 also comprises a front-axle actuator unit 16 which is assigned to a front axle of the motor vehicle. The front-axle actuator unit 16 is designed to apply a torque to a lower part 17 of the steering system 10. In particular, the front-axle actuator unit 16 is designed to steer wheels of the motor vehicle, to be more precise front wheels of the motor vehicle.

The front-axle actuator unit 16 further comprises a rotational angle sensor and/or a torque sensor. The front-axle actuator unit 16 can as a result determine a rotational angle of a lower part 17 of the steering system 10 and/or a torque acting on the lower part 17 of the steering system 10.

A control unit 18 is provided which is connected in signal-transmitting fashion to the steering wheel actuator unit 12 and the front-axle actuator unit 16. The control unit 18 is configured in such a way that it can control the steering wheel actuator unit 12 and the front-axle actuator unit 16 independently of one another. The control unit 18 is, in particular, a controller for an at least partially automated driving mode of the motor vehicle. During automated driving, the control unit 18 controls the front-axle actuator unit 16 on the basis of signals of sensors and/or cameras of the motor vehicle, in order to steer the motor vehicle. In addition, the control unit 18 can control the steering wheel actuator unit 12 during automated driving.

There is no mechanical operative connection (in particular no torque-transmitting operative connection) between the steering wheel actuator unit 12 and the front-axle actuator unit 16. The steering wheel actuator unit 12 and the front-axle actuator unit 16 are, however, connected to one another in a signal-transmitting fashion, in particular in such a way that data relating to the rotational angle of the steering wheel 14, to the torque acting on the steering wheel 14, to the rotational angle of the lower part 17 of the steering system 10 and/or to the torque acting on the lower part 17 of the steering system 10 are exchanged between the two actuator units 12, 16.

The steering system 10 is, in particular, designed to carry out a method described below with reference to FIG. 2.

Firstly, at least during the partially automated driving, at least one of the following variables is determined (step S1):

a gripping force which the driver applies to the steering wheel 14, a torque which the driver applies to the steering wheel 14, a deflection at the steering wheel 14, in particular a rotational angle of the steering wheel 14, a gradient of the gripping force which the driver applies to the steering wheel 14, a gradient of the torque which the driver applies to the steering wheel 14 and a gradient of the deflection of the steering wheel 14, in particular a rotational angle speed of the steering wheel 14. In particular, the at least one variable is determined by the rotational angle sensor and/or by the torque sensor of the steering wheel actuator unit 12.

Using the at least one determined variable it is now determined whether or not the driver wishes to control the motor vehicle manually (step S2). This step will be explained in more detail below.

The position of the steering wheel 14 is controlled differently depending on whether or not the driver wishes to control the motor vehicle manually.

If it is determined in step S2 that the driver does not wish to control the motor vehicle manually, the steering wheel 14 can be moved into a predefined rotational position (step S3). For example, the steering wheel 14 is moved into a central rotational position, that is to say into a position in which the steering wheel 14 is not rotated. In the central rotational position, input means for an Infotainment system of the motor vehicle, present on the steering wheel 14, are particularly easy to operate for the driver.

There can be provision that the steering wheel 14 is held in the predefined position with a torque which is limited to a predefined value. For this purpose, an opposing torque is applied to the steering wheel 14 by the steering wheel actuator unit 12, which opposing torque counteracts a torque acting on the steering wheel 14 in such a way that overall no torque acts on the steering wheel. The rotational position of the steering wheel 14 therefore remains unchanged. The opposing torque is limited here to the predefined value. Therefore, if, for example, the driver applies a torque which is greater than the predefined value to the steering wheel 14, the rotational position of the steering wheel 14 is changed as result.

In particular, the predefined rotational position of the steering wheel 14 is determined as a function of operating parameters of the motor vehicle, for example on the basis of the speed of the motor vehicle, a longitudinal acceleration of the motor vehicle and/or a lateral acceleration of the motor vehicle. There can be provision that the predefined rotational position is chronologically variable and is respectively newly determined at certain time intervals on the basis of the current operating parameters.

If it is determined in step S2 that the driver wishes to control the motor vehicle manually (in particular after a section of a route which has been travelled along in an automated fashion), the automated driving is ended (step S4). Steering movements which the driver applies to the steering wheel 14 are then immediately transmitted to the front-axle actuator unit 16, and converted by the latter into steering movements of the motor vehicle in that the front-axle actuator unit 16 controls the wheels of the motor vehicle, in particular the front wheels of the motor vehicle. A discrepancy between the current rotational position of the steering wheel 14 and a rotational position of the wheels is therefore initially ignored. In other words, the steering wheel 14 is not firstly moved into a rotational position which corresponds to the rotational position of the front wheels but instead the steering wheel 14 can be used by the driver to steer the motor vehicle immediately after the end of the automated driving.

For this purpose there can be provision that signals of the control unit 18 to the front-axle actuator unit 16 which serve to control the motor vehicle in an automated fashion are suppressed. Signals from the steering wheel actuator unit 12 to the front-axle actuator unit 16 are then prioritized over signals of the control unit 18. Alternatively, the control unit 18 can be partially switched off, in particular entirely switched off.

The steering wheel actuator unit 12 and the front-axle actuator unit 16 continue to be connected to one another in a signal-transmitting fashion in both cases. After it has been detected that the driver wishes to control the motor vehicle manually, a discrepancy between the current rotational position of the steering wheel 14 and the front wheels of the motor vehicle can be compensated automatically over a certain time period. This is done by virtue of the fact that a virtual transmission relationship between the steering wheel 14 and the front wheels during steering movements of the vehicle, that is to say, in particular, during cornering, is changed electronically in such a way that the discrepancy decreases without this substantially influencing the driver during the steering of the motor vehicle. The compensation of the discrepancy therefore takes place in an imperceptible fashion. This is achieved by virtue of the fact that there is no direct continuous mechanical coupling between the steering wheel and the front wheels.

Figure 2:
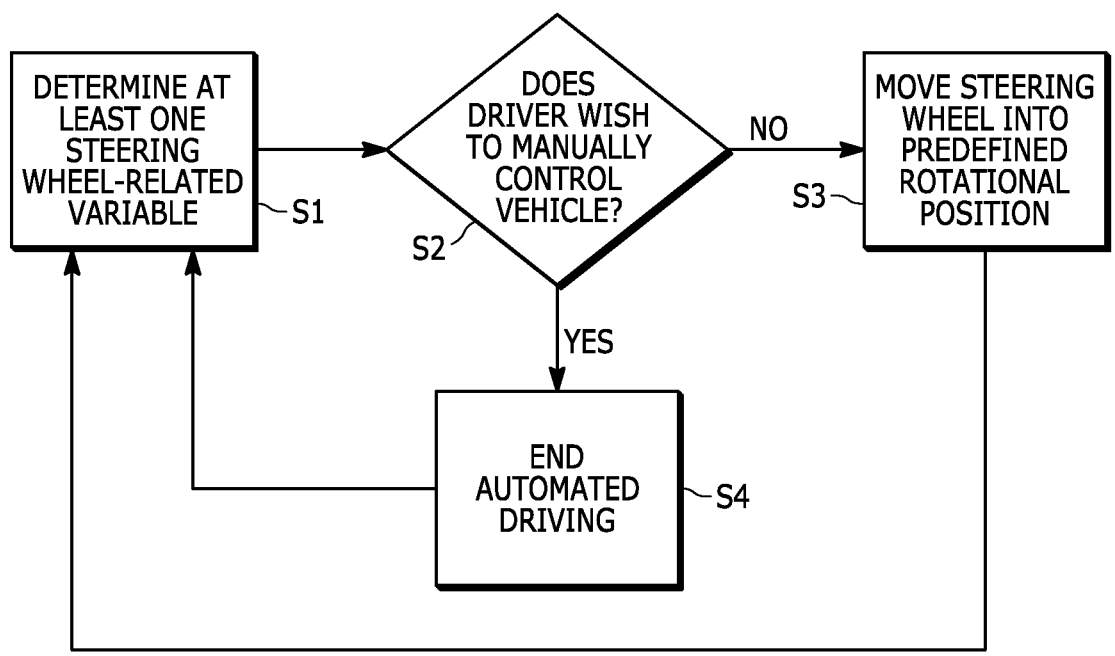
FIG. 2 shows a schematic flow chart of a method according to the invention.

At certain time intervals it is repeatedly ascertained whether or not the driver wishes to control the motor vehicle manually (indicated by the arrows in FIG. 2, which respectively lead back from S3 and S4 to S1). In particular, this takes place continuously at certain time intervals. In the text which follows, step S2 is explained in more detail with reference to an exemplary embodiment.

In this exemplary embodiment, it is determined by means of fuzzy logic whether or not the driver wishes to control the motor vehicle manually. For this purpose, at least the at least one variable acquired in step S1 is processed by means of fuzzy logic. In particular, all the acquired variables are processed. In addition there can be provision that data and/or signals of other vehicle systems are processed by means of fuzzy logic. Examples of such systems are Infotainment systems, a visual driver monitoring system (for example a camera which monitors the driver's eye movements) and hand recognition systems which recognize whether the driver's hands are located on the steering wheel 14.

The fuzzy logic processes the variables, and it is then determined from the processed variables whether the driver wishes to control the motor vehicle manually. For this purpose, a final value is calculated from all the processed variables ("defuzzification"). On the basis of this final value it is decided whether or not the driver wishes to control the motor vehicle manually.

For example it can be determined that the driver wishes to control the motor vehicle manually if at least one of the variables acquired in step S1 exceeds a predefined value. For example it is detected that the driver wishes to control the motor vehicle manually if the torque which the driver applies to the steering wheel exceeds a predefined maximum torque. The predefined maximum torque can be equal to the maximum opposing torque with which the steering wheel actuator unit 12 holds the steering wheel 14 in the predefined rotational position.

The fuzzy logic can be implemented in the control unit 18. The control unit 18 is then designed to process signals and/or data of the steering wheel actuator unit 12 by means of the fuzzy logic.

Alternatively, the fuzzy logic is implemented in the steering wheel actuator unit 12, to be more precise in a control module of the steering wheel actuator unit 12. The steering wheel actuator unit 12 is then designed to process, by means of the fuzzy logic, variables which are acquired by the rotational angle sensor and/or by the torque sensor of the steering wheel actuator unit 12.

If the motor vehicle has further control modules which are connected to the control unit and/or the control module via a bus in a data-transmitting fashion, the fuzzy logic can be implemented on a system which comprises the control unit and/or the control module, the further control modules and the bus.

The invention claimed is:

1. A method for operating a steering system of a motor vehicle, in particular a steer-by-wire steering system, wherein the steering system comprises a steering wheel actuator unit which is assigned to a steering wheel, a front-axle actuator unit and a control unit with the steering wheel actuator unit and the front- axle actuator unit being free of a torque-transmitting connection with one another, and wherein the control unit is designed to control the motor vehicle in an at least partially automated fashion, having the steps:
    at least one of the following variables is acquired at least during the partially automated driving: a gripping force which a driver applies to the steering wheel, a torque which the driver applies to the steering wheel, deflection of the steering wheel, in particular a rotational angle of the steering wheel, a gradient of the gripping force which the driver applies to the steering wheel, a gradient of the torque which the driver applies to the steering wheel, and a gradient of the deflection of the steering wheel, in particular a rotational angle speed of the steering wheel;
    the at least one variable is used to determine whether or not the driver wishes to control the vehicle manually;
    signals of the control unit designed to control the motor vehicle in an at least partially automated fashion being immediately and entirely suppressed in response to determining that the driver wishes to control the motor vehicle manually; and
    steering movements which the driver applies to the steering wheel are immediately converted into steering movements of the motor vehicle by the front-axle actuator unit in a signal-transmitting fashion without transmitting torque from the steering wheel actuator unit to the front-axle actuator unit, irrespective of the current rotational angle of the steering wheel, if it has been determined that the driver wishes to control the vehicle manually.

2. The method as claimed in claim 1, wherein it is determined that the driver wishes to steer the vehicle manually if the at least one acquired variable exceeds a first predefined value or if a plurality of the acquired variables exceed predefined values.

3. The method as claimed in claim 1 wherein during the automated driving the steering wheel is held in a predefined rotational position with a torque, in particular wherein the torque is limited to a second predefined value.

4. The method as claimed in claim 3, wherein the predefined rotational position is determined as a function of operating parameters of the motor vehicle.

5. The method as claimed in claim 1, wherein the control unit is at least partially switched off if it is determined that the driver wishes to control the motor vehicle manually.

6. The method as claimed in claim 1, wherein at certain time intervals it is ascertained, in particular continuously, whether or not the driver wishes to control the motor vehicle manually.

7. The method as claimed in claim 1, wherein data and/or signals of other systems of the motor vehicle, in particular of an Infotainment system and/or of a visual driver monitoring system, are used to determine whether or not the driver wishes to control the vehicle manually.

8. The method as claimed in claim 1, wherein by means of fuzzy logic it is determined whether the driver wishes to control the motor vehicle manually, in particular wherein the at least one variable is processed by means of fuzzy logic.

9. The method as claimed in claim 1, wherein after it has been detected that the driver wishes to control the motor vehicle manually, a discrepancy between the current rotational position of the steering wheel and a position of front wheels of the motor vehicle over a certain time period, in particular during cornering, is compensated by electronically changing the transmission ratio between the steering wheel and the wheels.

10. The method as claimed in claim 1, wherein during the automated driving the steering wheel is held in a predetermined, static rotational position determined as a function of a speed of the motor vehicle.

* * * * *